Nov. 17, 1942.   T. A. RICH   2,302,474
SUMMATION METER
Filed Feb. 18, 1942

Inventor:
Theodore A. Rich,
by Harry E. Dunham
His Attorney.

Patented Nov. 17, 1942

2,302,474

UNITED STATES PATENT OFFICE 2,302,474

SUMMATION METER

Theodore A. Rich, Schenectady, N. Y., assignor to General Electric Company, a corporation of New York Application February 18, 1942, Serial No. 431,430

4 Claims. (Cl. 171—34)

My invention relates to metering apparatus for obtaining an average or a summation measurement from a plurality of electric circuits and may be used for instance to obtain the sum of the currents or the sum of the watts in different electric circuits on a single meter.

In carrying my invention into effect I provide a meter or instrument device having such characteristics that it will respond to its average energization over a short period of time and provide commutation apparatus for cyclically connecting the meter or instrument to the different circuits to be metered for equal time intervals, one after the other, the cyclic period for making all of such connections being sufficiently short that the device will respond to the average energization from all of such circuits and hence may be calibrated in terms of the sum of the values being commutated.

The features of my invention which are believed to be novel and patentable will be pointed out in the claims appended hereto. For a better understanding of my invention, reference is made in the following description to the accompanying drawing in which Fig. 1 represents my invention as applied for obtaining a measurement of the sum of the currents in three circuits, and Fig. 2 represents the application of the invention for obtaining a measurement of the sum of the watts in two circuits.

Figure 1:
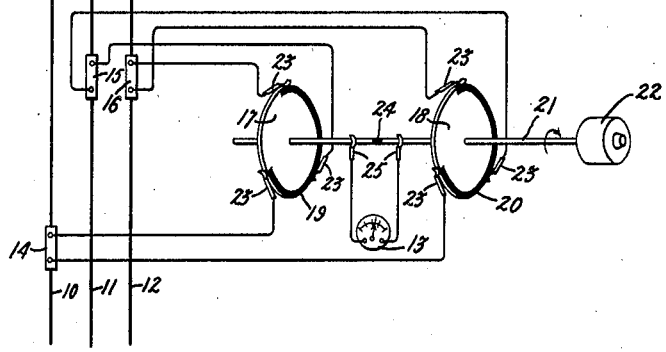
Figure 2:
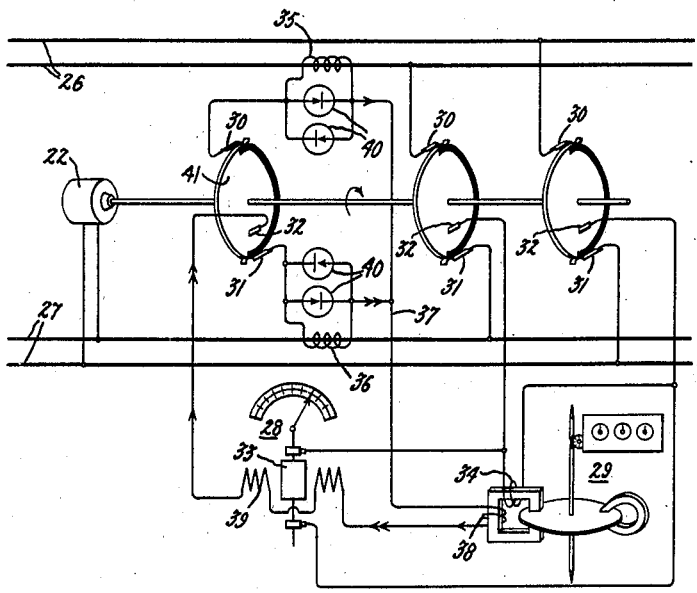

Referring to Fig. 1 I have represented three circuits 10, 11 and 12 which we may assume to be energized from independent sources of different voltage and in which currents A, B and C flow. My invention is here used to obtain a measurement of the sum of these currents on the meter 13. In the circuits I have represented current shunts 14, 15 and 16. Hence, across these shunts there will exist voltages proportional to the current flowing in the corresponding circuits. The three shunts are cyclically connected to the instrument 13 for equal short intervals of time by a suitable commutating device. The commutating device shown includes a pair of commutating disks having conducting segments 17 and 18 and insulating segments 19 and 20. These disks are mounted on a shaft 21 driven at a suitable speed by a motor represented at 22. Equally spaced about the periphery of each commutating disk are three brushes 23 bearing thereon. It will be noted that the span of the conducting segments 17 and 18 of the commutating disks is slightly less than the spacing of the brushes which in this case is 120 degrees. The upper set of brushes are connected across shunt 16, the lower right set of brushes are connected across shunt 15 and the lower left set of brushes are connected across shunt 14. The shaft 21 has an insulating section 24 between the disks separating conducting sections in electrical connection with the conducting segments 17 and 18 and brushes 25 bear on the conducting shaft sections and are connected across the instrument 13.

It is now seen that when the shaft 21 and the commutating disks rotate in a given direction at constant speed, the shunts 14, 15 and 16 will be cyclically connected across the instrument 13, each for a period of time required for the conducting segments 17 and 18 to move past the corresponding set of shunt brushes. Due to the fact that the conducting segments have a slightly shorter arc than the span of the brushes there is no danger of short circuit between the different lines 10, 11 and 12 through the shunt leads. Thus, assuming clockwise rotation, the brushes which connect shunt 14 to instrument 13 are just breaking contact, whereas the brushes across shunt 16 have not yet made contact with the conducting commutator segments.

Thus the different circuits are individually connected to the measuring instrument, and by individually I mean separately and at different times.

It is now seen that instrument 13 will be cyclically connected across each shunt in rotation for a period of time determined by the speed of rotation of motor 22. It is satisfactory for my purpose to have shaft 21 rotate between 200 and 300 R. P. M. The speed is preferably constant but constant speed is not required. Changes in speed produce second order errors which are negligible except for extreme changes. The instrument 13 should have such rate of response characteristic that when energized at the rate indicated, say 600 to 900 times per minute, there is not excessive oscillation of the indicator although it responds to the average energization current of several consecutive energizing impulses even if such oscillations are present. Most convenient electrical measuring instruments, such as direct current ammeters and wattmeters will so respond without change and other instruments may readily be made to do so as by suitable design. Such instrument as thus energized may be calibrated to indicate the sum of the currents A, B and C. The shunts 14, 15 and 16 when used should, of course, be identical in the sense that they produce equal IR drops per ampere. If it be assumed that instrument 13 is a standard instrument calibrated with one of the shunts to indicate the current flowing in the shunt its recalibration for purposes of my invention is calculated as follows:

Assume that the arc of commutator segments 17 and 18 are each 100 degrees. Then $$\text{Total current} = \text{Indicated current} \times \frac{360°}{100°}$$

$A+B+C=3.6$ (Instrument indication)

Hence the measurement indication should be multiplied by the factor 3.6 to obtain the summation current $A+B+C$ in amperes, or the instrument may be provided with a scale of 3.6 times the normal scale value to read the summation current directly. It will be well to check such calculated calibration with the actual operation results to adjust for any minor discrepancy that may be occasioned by commutation losses and the like.

In Fig. 2, 26 and 27 represent two single phase power circuits and 28 an indicating or recording wattmeter and 29 an integrating watthour meter for summing the watts and watthours, respectively, in the two power circuits by means of my invention. The meters 28 and 29 are of ordinary construction but calibrated for direct summation reading. No particular frequency or phase relation needs to exist between the power circuits except that the frequencies should be near enough together so as not to give rise to frequency errors in the meters.

Since only two metering circuits are involved, the commutator disks may have conducting segments of nearly 180 degrees with the brushes spaced 180 degrees as shown. The voltage of circuit 26 is led through brushes 30 and brushes 32 to energize the voltage coil 33 of the wattmeter and voltage coil 34 of the watthour meter in parallel. Similarly the voltage of circuit 27 is led through brushes 31 and 32 to energize the same coils.

I have represented current transformers for reducing the measurement currents and since such transformers insulate the secondary and primary circuits, one commutator disk 41 is sufficient for current commutating purposes. Hence, one secondary terminal of the current transformers is connected in parallel by wire 37 and directly to the current coils 38 and 39 of the meters in series. The single headed arrow on this circuit indicates the path of measurement current from transformer 35 and the double headed arrow indicates the path of measurement current from transformer 36. Since the secondaries of these transformers would otherwise be open circuited portions of the time by the commutator disk 41, I have provided neon tubes 49 across the secondaries so that alternating current may pass when the secondaries are otherwise open. Such tubes or their equivalent will not prevent the flow of the metering current to the meters because when the metering paths are closed, the corresponding neon tubes will not break down to pass current. 22 represents a synchronous or induction motor energized from one of the power circuits for driving the commutating disks at the desired speed.

It is, of course, essential that when the meters are energized by the voltage of a particular power circuit the current coils also be energized from the same circuit. Assuming clockwise rotation power circuit 27 has just been metered and power circuit 26 is just about to be connected for metering, these watt metering circuits are connected alternately so that the meters receive metering impulses at 600 times per minute for example.

The commutating speeds mentioned contemplate correct measurements even though the current in one or two of the lines of Fig. 1 or one of the power circuits of Fig. 2 be zero.

It is evident that the same apparatus may be used to measure current or power in the individual lines or circuits separately by merely stopping rotation of the commutating devices and turning by hand to connect the circuit desired. The single circuit reading obtained will then be multiplied by the proper calibration factor which, in the case of Fig. 1, is about 1/3.6 assuming the scale is marked for the sum of the three currents.

In Fig. 2, assuming the commutating arc to be 170 degrees and $W_1$ and $W_2$ the watts of the two power circuits and $W$ the normally calibrated watt reading of meter 28, the calculated conversion equation is $$\frac{W_1 + W_2}{2} = \frac{180}{170} \ (W)$$

$$W + W_2 = \frac{36}{17} \ (W)$$

Here again actual calibration of both the wattmeter and the watthour meter will be desirable. The calibration of the watthour meter is particularly desirable since its highly inductive potential circuit may introduce time-lags that should be calibrated out. For convenience, the wattmeter 28 may be provided with a double scale, as indicated, one calibrated to read summation watts $W_1 + W_2$, the other the normal watts $W$.

In the same way other electrical measurements involving both the current and voltage of power circuits may be averaged on a single instrument; for instance, the average power factor of a polyphase circuit may be obtained on a single phase power factor meter.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Apparatus for obtaining the average sum of a plurality of similar electrical quantities comprising electrical measuring apparatus and commutating means for individually and cyclically connecting such electrical measuring apparatus in measurement relation with the plurality of quantities to be averaged one after the other for equal time periods, the cyclic period for making all of such connections being sufficiently short as to cause the measuring apparatus to respond to the average of all of such electrical quantities.

2. Apparatus for obtaining the average sum of similar electrical quantities in a plurality of electrical circuits comprising in combination with such electrical circuits, electrical measuring apparatus of a type capable of measuring such electrical quantity in one such circuit, and commutating means for individually and cyclically connecting said measuring apparatus in measurement relation with the plurality of electrical circuits one after the other for equal periods of time, the cyclic period for making all of such connections being sufficiently short in comparison with the rate of response of the measuring apparatus that the latter responds to the average of all of such electrical quantities.

3. Electrical measurement summation apparatus for a plurality of separate electrical circuits, comprising in combination with such circuits, electrical measuring apparatus, commutating apparatus connected between said plurality of electrical circuits and said measuring apparatus, said commutating apparatus serving when operated at constant rate to cyclically and individually connect each of said circuits in measuring relation with said measuring apparatus for equal periods of time, said commutating apparatus having provisions for insulating the different circuits from each other, and substantially constant speed means for operating said commutating apparatus at a rate to complete the cycle of connections between the measuring apparatus and all of the circuits in a period of time, which, in comparison to the rate of response of the electrical measuring apparatus, allows the latter to respond to the average energization received during such cyclic period.

4. Apparatus for obtaining the average sum of similar measurements involving both current and voltage of a plurality of electric power circuits, comprising in combination with such power circuits electric measuring apparatus having current and voltage energizing circuits, commutating means for cyclically and individually energizing the current circuit of said measuring apparatus in response to the currents flowing in the plurality of electric-power circuits, commutating means for cyclically and individually energizing the voltage circuit of said measuring apparatus in response to the voltages of the same power circuits, and common means for operating said current and voltage commutating means in a synchronous relation such that the current and voltage circuits of the measuring apparatus are energized in response to the current and voltage of the same power circuit simultaneously and the periods of energization with respect to the different power circuits are of equal duration and the cycle of commutation covering all of the power circuits is sufficiently short in comparison to the rate of response of the measuring apparatus that the latter responds to the average energization of all of the power circuits.

THEODORE A. RICH.